(No Model.)
W. M. SAYRE.
NUT LOCK.
No. 495,520. Patented Apr. 18, 1893.
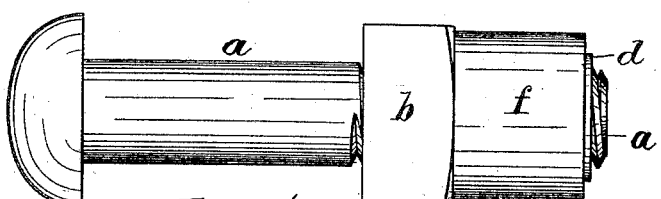 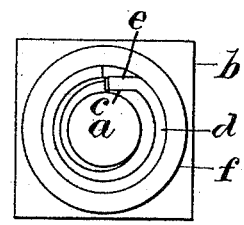
Fig. 1. Fig. 2.
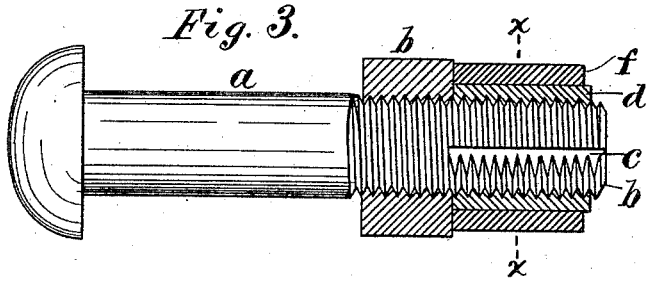 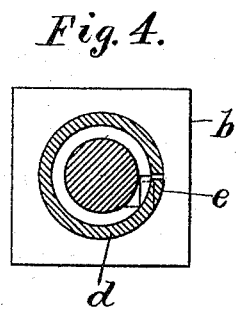
Fig. 3. Fig. 4.
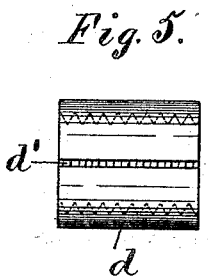 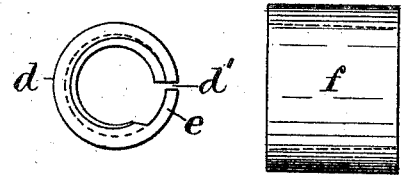 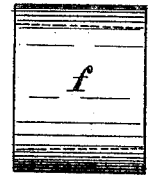 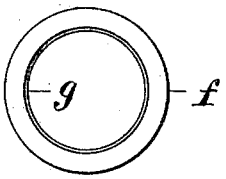
Fig. 5. Fig. 6. Fig. 7. Fig. 8.
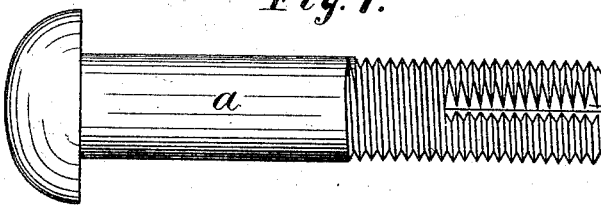 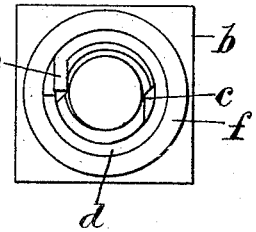
Fig. 9. Fig. 10.
Attest:
L. Lee,
Edw. P. Kinsey
Inventor.
Winthrop M. Sayre,
per Crane & Miller, attys.

UNITED STATES PATENT OFFICE.

WINTHROP M. SAYRE, OF SOUTH ORANGE, NEW JERSEY.

NUT-LOCK.

SPECIFICATION forming part of Letters Patent No. 495,520, dated April 18, 1893.

Application filed February 1, 1893. Serial No. 460,588. (No model.)

*To all whom it may concern:*

Be it known that I, WINTHROP M. SAYRE, a citizen of the United States, residing at South Orange, Essex county, New Jersey, have invented certain new and useful Improvements in Nut-Locking Appliances, fully described and represented in the following specification and the accompanying drawings, forming a part of the same.

In the present invention the locking appliance is made independent of the nut, and applied to the bolt outside of the same to prevent the nut from retraction.

The invention consists in the combination with a bolt having a groove formed across the thread of an independent threaded sleeve having a tongue adapted to bend into the groove. In some cases I also use a tapering collar adapted to jam over the sleeve to hold it in place when adjusted.

In the annexed drawings, Figure 1 is a side view, and Fig. 2 an end view of a bolt provided with my improvement. Fig. 3 shows the bolt with the nut and the locking appliance in section. Fig. 4 is a section taken on line $x, x,$ in Fig. 3, with the collar $f$ omitted. Fig. 5 is a side view, and Fig. 6 an end view of the threaded sleeve. Fig. 7 is a side view, and Fig. 8 an end view of the tapering collar. Fig. 9 is a side view of the bolt with the nut and locking device removed; and Fig. 10 is an end view showing the bolt with two grooves.

$a$ designates the bolt, $b$ the nut usually applied thereto.

$c$ is a longitudinal groove penetrating the thread, and $d$ a sleeve threaded internally to screw upon the bolt over the groove. The sleeve is formed with a longitudinal slot $d'$ at one side, and the edge of the sleeve adjacent to the slot is made thin enough to form a tongue $e$ to bend into the groove, as shown in Figs. 1, 4 and 10. A collar $f$ is formed to fit over the sleeve, and has its inner surface tapered to crowd upon the sleeve and jam the same tightly upon the bolt. The thickness of the sleeve and collar is exaggerated in the drawings to show the construction clearly, but in practice the parts may be made of suitable weight and strength in malleable cast iron, and with a very slight taper upon the interior of the collar.

In using this appliance, the nut is first screwed up, and the sleeve then screwed upon the bolt with the tongue opposite the groove. By a blow from a hammer or other suitable tool, the tongue is then bent into the groove as shown in Fig. 2; and the collar is then driven tightly over the outside of the sleeve, as shown in Figs. 1 and 3, by one or more blows of the hammer. In Fig. 4 the sleeve is shown upon the bolt in readiness to bend the tongue, the latter being shown bent in dotted lines. The sleeve, before bending the tongue into the groove, is screwed as closely to the nut as possible to prevent the retraction of the latter, and, to secure a closer adjustment of the sleeve upon the nut, the bolt may be furnished with two or more grooves to avoid the complete rotation of the sleeve to bring the tongue opposite to a single groove. By reason of its thread and bent tongue, the sleeve is completely fastened on the bolt.

The sleeve, by reason of the slot $d$, is adapted to yield when compressed or clamped by the tapering collar, and as the sleeve is threaded internally such clamping pressure causes it to grip firmly upon the thread, and holds it from retraction independently of the tongue. The device thus furnishes a double resistance to any unlocking tendency.

The collar may be removed when necessary by driving a tapering chisel between the nut and the inner end of the collar, and the sleeve may then be retracted by turning it with a pipe wrench, which operates to bend the tongue out of the groove into its initial shape.

The device may be applied to bolts for railroad fish plates, for bridge building, for steam hammers, and for other constructions where the nut is liable to jar loose, and it is evident that the combination of the collar with the sleeve renders it impossible for the sleeve to become accidentally dislodged and the bolt released from the nut.

I am aware that a flexible tongue has been attached directly to a nut to engage a groove in the bolt; but my invention differs from such construction in being entirely independent of the nut, so that the ordinary nuts may be used.

I prefer to use the collar in combination with the sleeve, but it is obvious that the sleeve alone is prevented from longitudinal movement by its thread and from rotation by the bent tongue, and it therefore forms a complete lock, which is adapted in many circumstances to hold the nut sufficiently without the use of the collar. Where the nut is exposed to abuse, or the sleeve is liable to interference from any cause, the collar furnishes an efficient means of protecting it and securing it in place.

The flexible tongues heretofore used have not been protected by a collar nor clamped rigidly upon the bolt by driving the collar over the sleeve in which the tongue is formed. Such a driven collar adheres rigidly to the sleeve and renders it impossible for the sleeve or tongue to be displaced by accident.

Having thus set forth my invention, what I claim is—

1. The combination, with the bolt $a$ having one or more grooves $c$, of the nut $b$, and the separate threaded sleeve $d$ provided with slot $d'$ and tongue $e$, as and for the purpose set forth.

2. The nut locking device, consisting in the threaded sleeve $d$ provided with slot $d'$ and tongue $e$, as set forth, and the tapering collar $f$ adapted to fit tightly over the sleeve, substantially as herein set forth.

3. The combination, with the bolt $a$ having one or more grooves $c$, of the nut $b$, and the separate sleeve $d$ provided with slot $d'$ and tongue $e$, and the tapering collar $f$ adapted to fit tightly over the sleeve, as and for the purpose set forth.

In testimony whereof I have hereunto set my hand in the presence of two subscribing witnesses.

WINTHROP M. SAYRE.

Witnesses:
L. LEE,
THOMAS S. CRANE.